United States Patent [19]

Nakahara et al.

[11] Patent Number: 4,812,498

[45] Date of Patent: Mar. 14, 1989

[54] POLYCARBONATE RESIN COMPOSITIONS HAVING IMPROVED RESISTANCE TO DETERIORATION WHEN EXPOSED TO LIGHT AND CONTAINING ALKYLIDENE BIS(BENZOTRIAZOLYL PHENOLS)

[75] Inventors: Yutaka Nakahara, Okegawa; Atsushi Nishimura, Washinomiya; Toshio Nakajima, Urawa, all of Japan

[73] Assignee: Adeka Argus Chemical Co., Ltd., Urawa, Japan

[21] Appl. No.: 945,733

[22] Filed: Dec. 22, 1986

[51] Int. Cl.[4] .............................. C08K 5/34
[52] U.S. Cl. .................... 524/91; 524/83; 524/84; 524/99; 524/100; 524/102; 524/111; 524/118; 524/119; 524/120; 524/141; 524/148; 524/151; 524/153; 524/157; 524/171; 524/316; 524/321; 524/324; 524/326; 524/330; 524/334; 524/335; 524/336; 524/337; 524/338
[58] Field of Search .............. 524/91, 83, 84, 99, 524/100, 102, 111, 118, 119, 120, 141, 148, 151, 153, 157, 171, 316, 321, 329, 326, 330, 334, 335, 336, 337, 338; 548/259, 260

[56] References Cited

U.S. PATENT DOCUMENTS

| | | | |
|---|---|---|---|
| 3,322,719 | 5/1967 | Peilstöcker | 524/91 |
| 3,367,958 | 2/1968 | Kirkendall | 524/91 |
| 3,892,889 | 7/1975 | Cohnen et al. | 524/91 |
| 3,936,305 | 2/1976 | Hiraishi et al. | 548/260 |
| 4,085,089 | 4/1978 | Irick, Jr. et al. | 524/91 |
| 4,315,848 | 2/1982 | Dexter et al. | 524/91 |
| 4,426,471 | 1/1984 | Berner et al. | 524/91 |
| 4,681,905 | 7/1987 | Kubota et al. | 524/91 |
| 4,684,679 | 8/1987 | Kubota et al. | 524/91 |
| 4,684,680 | 8/1987 | Kubota et al. | 524/91 |

FOREIGN PATENT DOCUMENTS

| | | | |
|---|---|---|---|
| 247480 | 12/1987 | European Pat. Off. | 524/91 |
| 161533 | 12/1975 | Japan | 524/91 |
| 1171888 | 11/1969 | United Kingdom | 524/91 |

OTHER PUBLICATIONS

Chemical Abstracts 74, 53666f (1971).
Chemical Abstracts 77, 62720h (1972).

Primary Examiner—Kriellion S. Morgan

[57] ABSTRACT

Polycarbonate resin compositions are provided having improved light stability and comprising an alkylidene bis(benzotriazolyl phenol) having the formula:

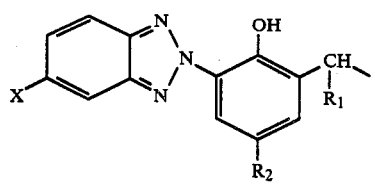

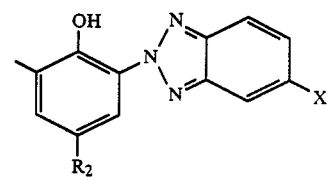

wherein:
$R_1$ is selected from the group consisting of hydrogen and alkyl having from one to about eleven carbon atoms;
$R_2$ is selected from the group consisting of alkyl having from one to about twelve carbon atoms; and arylalkyl having from seven to about eighteen carbon atoms; and
X is selected from the group consisting of hydrogen; halogen; alkyl having from one to about twelve carbon atoms; aryl alkyl having from seven to about eighteen carbon atoms; alkoxy having from one to about twelve carbon atoms; phenoxy; arylalkoxy having from seven to about eighteen carbon atoms; and phenyl.

26 Claims, No Drawings

POLYCARBONATE RESIN COMPOSITIONS HAVING IMPROVED RESISTANCE TO DETERIORATION WHEN EXPOSED TO LIGHT AND CONTAINING ALKYLIDENE BIS(BENZOTRIAZOLYL PHENOLS)

Polycarbonate resins undergo a decrease in mechanical strength and an increase in color when exposed to ultraviolet light.

Light stabilizers accordingly are added to improve the resistance of the polycarbonate resin to such deterioration, of which the benzotriazole type are used most frequently. However, the available benzotriazoles are not as effective as would be desired.

U.S. Pat. No. 3,936,305, patented Feb. 3, 1976, to Hiraishi, Futaki, Horii and Yamashita, discloses that compounds represented by the following general formula are extremely effective as ultraviolet ray-absorbing agents, especially for color photographic photosensitive materials:

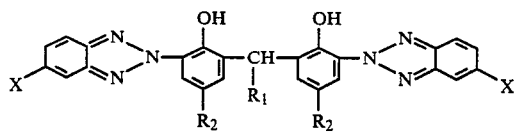

wherein $R_1$ is an alkyl group having 1 to 13, preferably 5 to 13 carbon atoms, $R_2$ is an alkyl group having 1 to 18 carbon atoms and X is hydrogen, a halogen, an alkyl, an alkoxy, an aryloxy, an aralkyloxy or an aryl group.

The patentees note that hydroxy benzotriazole is known as an excellent ultraviolet ray-absorbing agent, but gives solubility problems, crystallizing out in the amounts needed for adequate protection. The alkylidene-bis-benzotriazolylphenols are more soluble, and in addition cause no discoloration and are not colored themselves, when used in photosensitive gelatin or other hydrophilic protective colloid compositions.

2,2'-Methylene-bis-(4-hydrocarbyl-6-benzotriazolylphenols) are known light stabilizers for plastics, and a process for preparing them is disclosed in *Chemical Abstracts* 74 53666f (1971) and 77 62720h (1972).

In accordance with this invention, polycarbonate resin compositions are provided having improved light stability and comprising an alkylidene bis(benzotriazolyl phenol) having Formula I below:

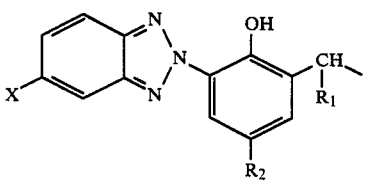

wherein:

$R_1$ is selected from the group consisting of hydrogen and alkyl having from one to about eleven carbon atoms;

$R_2$ is selected from the group consisting of alkyl having from one to about twelve carbon atoms; and arylalkyl having from seven to about eighteen carbon atoms; and X is selected from the group consisting of hydrogen; halogen; alkyl having from one to about twelve carbon atoms; aryl alkyl having from seven to about eighteen carbon atoms; alkoxy having from one to about twelve carbon atoms; phenoxy; arylalkoxy having from seven to about eighteen carbon atoms; and phenyl.

Exemplary $R_1$ alkyl include methyl, ethyl, propyl, isopropyl, butyl, isobutyl, sec-butyl, tert-butyl, amyl, isoamyl, tert-amyl, hexyl, isohexyl, sec-hexyl, heptyl, sec-heptyl, tert-heptyl, isoheptyl, octyl isooctyl, sec-octyl, tert-octyl, 2-ethylhexyl, nonyl, isononyl, tert nonyl, decyl, isodecyl and undecyl;

Exemplary $R_2$ and X alkyl include methyl, ethyl, propyl, isopropyl, butyl, isobutyl, sec-butyl, t-butyl, amyl, isoamyl, t-amyl, hexyl, isohexyl, tert-hexyl, octyl, 2-ethylhexyl, isooctyl, 1,1,3,3-tetramethylbutyl, nonyl, isononyl, tert-nonyl, decyl, isodecyl and dodecyl;

Exemplary $R_2$ and X arylalkyl include benzyl, α-methylbenzyl, mesityl, xylyl, and cumyl;

Exemplary X halogen include chlorine, bromine, iodine and fluorine;

Exemplary X alkoxy and arylalkoxy include methoxy, ethoxy, propoxy, isopropoxy, butoxy, isobutoxy, sec-butoxy, tert-butoxy, amyloxy, isoamyloxy, sec-amyloxy, tert-amyloxy, hexoxy, isohexoxy, heptoxy, isoheptoxy, octyloxy, isooctyloxy, 2-ethylhexoxy, tert-octyloxy, nonyloxy, isononyloxy, decyloxy, isodecyloxy, undecyloxy, and dodecyloxy; benzyloxy, xylyloxy, 2-methylbenzyloxy, cumyloxy, mesityloxy and xylyloxy.

Preferred alkylidene bis(benzotriazolyl phenols) falling within the invention include:

2,2'-methylenebis(4-methyl-6-benzotriazolyl phenol)
2,2'-methylenebis(4-(1,1,3,3-tetramethylbutyl)-6-benzotriazolyl phenol)
2,2'-methylenebis(4-cumyl-6-benzotriazolyl phenol)
2,2'-octylidenebis(4-methyl-(5'-methylbenzotriazolyl)phenol)
2,2'-octylidenebis(4-methyl-(5'-chlorobenzotriazolyl)phenol)

The alkylidene-bis-benzotriazolyl-phenols can be prepared by:

(1) reacting a 4-hydrocarbyl-6-benzotriazolyl phenol having the formula I:

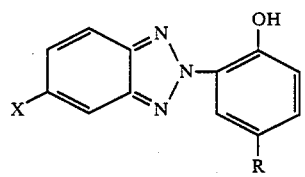

with an amine $HNR_1R_2$ and formaldehyde in an organic solvent to produce a Mannich base having formula II:

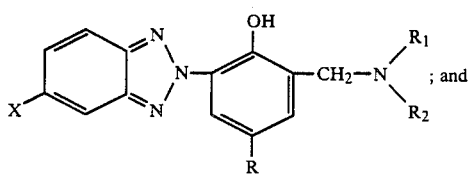

(2) reacting the Mannich base with itself or a 4-hydrocarbyl-6-benzotriazolyl phenol having formula I, thereby forming a 2,2'-methylene-bis-(4-hydrocarbyl-6-benzotriazolyl-phenol.

The following Examples represent preferred embodiments of the process.

EXAMPLE 1

Preparation of 2,2'-methylene-bis-(4-methyl-6-benzotriazolyl-phenol)

4-Methyl-6-benzotriazolyl-phenol 225 g, diethylamine 110 g, and paraformaldehyde 51.8 g were dissolved in 250 ml of butanol, and heated with stirring at reflux temperature (95° C. to 105° C.) for 24 hours. The solvent was vacuum distilled off, and 308 g of 2-diethylaminomethyl-4-methyl-6-benzotriazolyl-phenol Mannich base was obtained as residue. (Yield=99%)

This Mannich base, 7.8 g, was dissolved in 20 ml of xylene, and sodium methylate (28% methanol solution) 0.15 g was added. The solution was heated with stirring under reflux at 140° C. to 150° C. for 10 hours while a nitrogen stream was passed through the reaction mixture. The solvent was vacuum distilled off, and 6.1 g of crude product was obtained as residue. (Purity=91%; Yield=96%)

The crude product was recrystallized from xylene, and a pale yellow powder, 2,2'-methylene-bis-(4-methyl-6-benzotriazolylphenol melting at 285° C. was obtained.

EXAMPLE 2

Preparation of 2,2'-methylene-bis-(4-methyl-6-benzotriazolyl-phenol)

6.2 g of the Mannich base obtained in Example 1 and 4-methyl-6-benzotriazolyl-phenol 4.5 g were dissolved in 200 ml of xylene, and sodium methylate (28% methanol solution) 0.2 g was added. The solution was heated with stirring under reflux at 140°-150° C. for 10 hours with a stream of nitrogen. After distilling of the solvent, and recrystallizing the residue from xylene, the desired product 2,2'-methylene-bis-(4-methyl-6-benzotriazolyl-phenol) was obtained in 95% yield.

EXAMPLE 3

Preparation of 2,2'-methylene-bis-(4-(1,1,3,3-tetramethyl)butyl-6-benzotriazolyl-phenol)

2-Diethylaminomethyl-4-(1,1,3,3-tetramethyl)butyl-6-benzotriazolyl-phenol Mannich base was prepared using 4-(1,1,3,3-tetramethyl)butyl-6-benzotriazolyl-phenol by the same procedure as in Example 1. This Mannich base 37 g and 4-(1,1,3,3-tetramethyl)butyl-6-benzotriazolyl-phenol 25 g were dissolved in 60 ml of xylene, and sodium methylate (28% methanol solution) 3.1 g was added. The solution was heated with stirring under reflux at 140°-150° C. for 10 hours with a stream of nitrogen. After distilling of the solvent, and recrystallizing the residue from xylene, 55.2 g of the crude product was obtained. (Purity=93%; Yield=93%)

The crude product was recrystallized from n-heptane, and a white powder, 2,2'-methylene-bis-4-(1,1,3,3-tetramethyl)butyl-6-benzotriazolyl-phenol, melting at 200° C. was obtained.

EXAMPLE 4

Preparation of 2,2'-methylene-bis-(4-cumyl-6-benzotriazolyl-phenol)

2-Diethylaminomethyl-4-cumyl-6-benzotriazolyl-phenol Mannich base was prepared using 4-cumyl-6-benzotriazolyl-phenol by the same procedure as in Example 1. This Mannich base 10.0 g and 4-cumyl-6-benzotriazolyl-phenol 6.6 g were dissolved in 60 ml of xylene, and sodium methylate (28% methanol solution) 3.1 g was added. A white crystalline product, 2,2'-methylene-bis(4-cumyl-6-benzotriazolyl-phenol) melting at 190° C. was obtained. (Yield=93%).

EXAMPLE 5

Preparation of 2,2'-methylene-bis-(4-methyl-6-benzotriazolyl-phenol)

31.0 g of the Mannich base obtained in Example 1 and methyl iodide 30 g were dissolved in 100 g of ethanol, and heated with stirring at reflux temperature (60° C. to 75° C.) for 24 hours. The solvent was distilled off, and the pale yellow crystalline product (methyl-diethyl-2-hydroxy-3-benzotriazolyl-5-methylbenzylammonium iodide) was obtained by recrystallization from ethanol.

This product 9.0 g and sodium methylate (28% methanol solution) 4.0 g were dissolved in 40 g of butoxyethoxyethanol, and heated with stirring at reflux temperature (160° C. to 170° C.) for 10 hours while a nitrogen stream was passed through the reaction mixture. The solvent was vacuum distilled off, and 6.1 g of crude product was obtained as residue. (Purity=91%; Yield=96%)

The crude product was recrystallized from xylene and the desired product, 2,2'-methylene-bis-(4-methyl-6-benzotriazolylphenol) was obtained in 95% yield.

The amount of alkylidenebis (benzotriazolyl phenol) is not critical. An amount within the range from about 0.001 to about 5, preferably from about 0.01 to about 3, parts by weight per 100 parts by weight of polycarbonate resin is effective. Larger amounts can be used, but are usually unnecessary.

The polycarbonate resins of this invention are high molecular weight polymers of dihydric phenols of the formula:

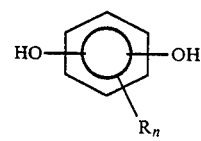

II in which R is hydrogen or alkyl having from one to twelve carbon atoms and n is a number from one to four. R is exemplified by $R_2$ of Formula I and carbonic acid. These are known polycarbonates, and are prepared by reaction of such dihydric phenols with carbonic acid and derivatives thereof.

Dihydric phenols which can be used to produce polycarbonate resins include, for example, bis(4-hydroxyphenyl)methane, 2,2-bis(4-hydroxyphenyl)propane (Bisphenol A), 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)ether, bis(4-hydroxy-3,5-dichlorophenyl)ether, 4,4'-dihydroxydiphenyl, 3,3'-dichloro-4,4'-dihydroxydiphenyl, bis(4-hydroxyphenyl)-sulfone, bis(4-hydroxyphenyl)sulfoxide, bis(4-hydroxy-3,5-dibromophenyl)-sulfoxide, 1,4-dihydroxy-2,5-dichlorobenzene, 1,4-dihydroxy-3-methylbenzene, resorcinol and hydroquinone.

Carbonic acid derivatives include halogenated carbonyls such as dichloro carbonyl (phosgene) and dibromo carbonyl; carbonate esters such as diphenylcarbonate, di(chlorophenyl)carbonate, ditolylcarbonate and dinaphthylcarbonate; and haloformates such as hydroquinone bis(chloroformate) and ethyleneglycol bis(chloroformate). Generally, phosgene is used to produce polycarbonate resins.

The polycarbonate resins are prepared by reacting dihydric phenols with carbonic acid derivatives in the presence of a chain terminator and an acid acceptor, if desired.

Chain terminators include phenol, cyclohexanol, methanol, p-t-butylphenol and p-bromophenol.

Acid acceptors include organic amines such as pyridine, triethylamine and dimethylaniline; and hydroxides, carbonates, bicarbonates and phosphates of alkaline and alkaline earth metals.

The light stabilizers of this invention can be employed as the sole stabilizer. They can also be used in combination with conventional heat-stabilizers and antioxidants for polycarbonate resins, and among them, phenolic antioxidants are preferred.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

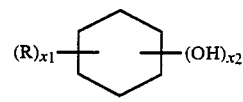

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

The polycyclic phenol phenol is one having at least two aromatic nuclei linked by a polyvalent linking radical, as defined by the formula:

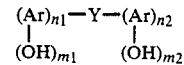

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar-Y-Ar-Y-Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g., chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy

where R' is aryl, alkyl or cycloalkyl, or thiohydrocarbon groups having from one to about thirty carbon atoms, and carboxyl

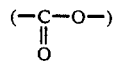

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluoroenyl groups.

When Ar is a benzene nucleus, the polyhydric polycyclic phenol has the structure:

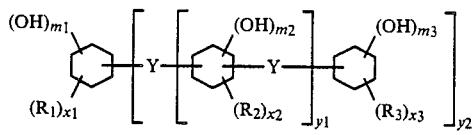

wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four, and $x_2$ is an integer from zero to three;

$y_1$ is an integer from zero to about six and $y_2$ is an integer from one to five, preferably one or two.

Preferably, the hydroxyl groups are located ortho and/or para to Y.

Exemplary Y groups are alkylene, alkylidene, and alkenylene; arylene, alkyl arylene, arylalkylene; cycloalkylene, cycloalkylidene; and oxa- and thia-substituted such groups; tetrahydrofuranes, esters and triazino groups. The Y groups are usually bi, tri, or tetravalent, connecting two, three or four Ar groups. However, higher valency Y groups connecting more than four Ar groups, can also be used. According to their constitution, the Y groups can be assigned to subgenera as follows:

(1) Y groups where at least one carbon in a chain or cyclic arrangement connect the aromatic groups, such as: —CH$_2$—CH$_2$—; —(CH$_2$)$_5$—; —CH$_2$—;

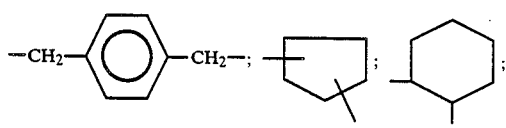

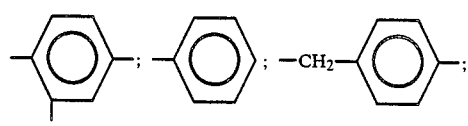

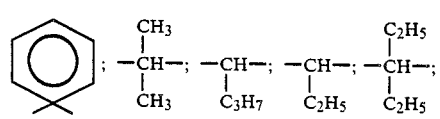

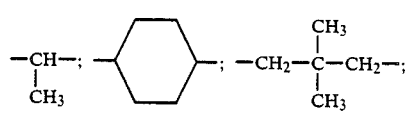

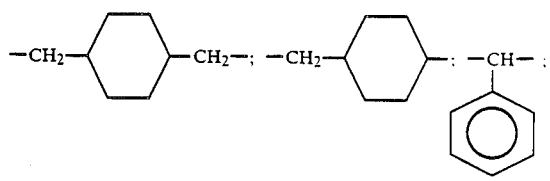

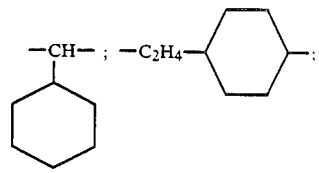

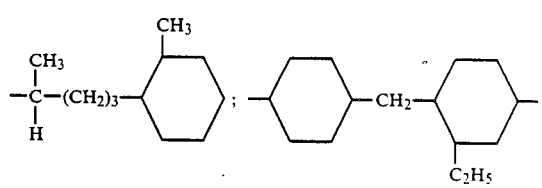

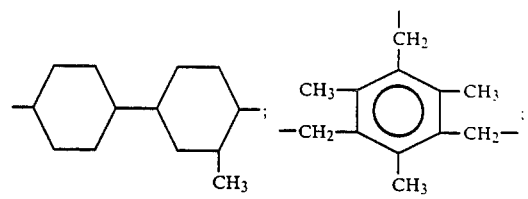

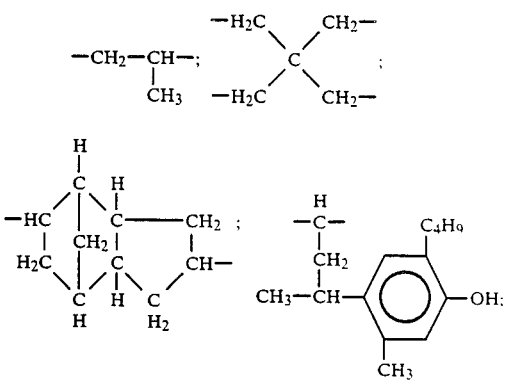

(2) Y groups where only atoms other than carbon link the aromatic rings, such as —O—, —S—,

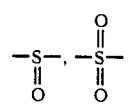

and

where x is a number from one to ten;

(3) Y groups made up of more than a single atom including both carbon and other atoms linking the aromatic nuclei, such as:

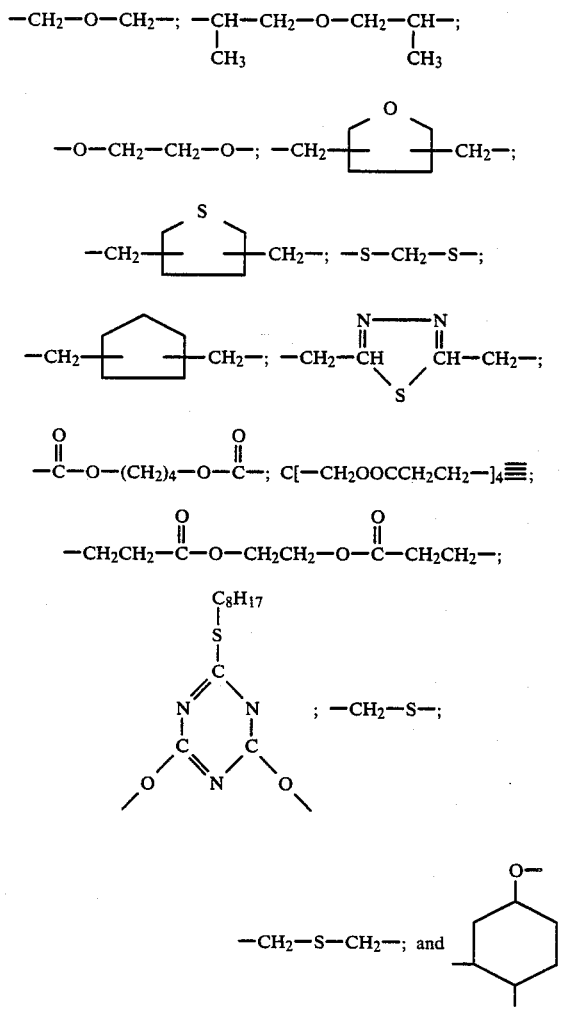

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenyl-phenol, o-, m- and p-xylenols, the carvenols, symmetrical xylenol, thymol, o-, m- and p-nonylphenol, o-, m- and p-dodecyl-phenol, and o-, m- and p-octyl-phenol, o-, and m-tert-butyl-p-hydroxy-anisole, p-n-decyloxy-phenol, p-n-decyloxy-cresol, nonyl-n-decyloxycresol, eugenol, isoeugenol, glyceryl monosalicylate, methyl-p-hydroxy-cinnamate, 4-benzyloxy-phenol, p-acetylaminophenol, p-stearyl-aminophenol, methyl-p-hydroxybenzoate, p-dichlorobenzoyl-aminophenol, p-hydroxysalicyl anilide, stearyl-(3,5-di-methyl-4-hydroxy-benzyl)thioglycolate, stearyl-β-(4-hydroxy-3,5-di-t-butylphenyl)propionate, distearyl-3,5-di-t-butyl-4-hydroxybenzylphosphonate, and distearyl(4-hydroxy-3-methyl-5-t-butyl)benzylmalonate.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxyphenyl)propane, methylene-bis-(p-cresol), 4,4'-benzylidene bis(2-tertiary-butyl-5-methyl-phenol), 4,4'-cyclo-hexylidene bis-(2-tertiary-butylphenol), 2,2'-methylene-bis-(4-methyl-6-(1'-methyl-cyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl)butane, ethylene bis-(p-cresol), 4,4'-oxobis-phenol, 4,4'-oxobis-(3-methyl-5-isopropyl-phenol), 4,4'-oxobis-(3-methyl-phenol), 2,2'-oxobis-(4-dodecyl-phenol), 2,2'-oxobis-(4-methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methylphenol), 2,2'-methylene-bis-(4-methyl-6-(1'-methyl-cyclohexyl)phenol, 4,4'-cyclohexylene bis-(2-tertiary-butyl-phenol), 2,6-bis-(2'-hydroxy-3'-t-butyl-5'-methyl-benzyl)-4-methyl-phenol, 4,4'-oxobis(naphthalene-1,5-diol), 1,3'-bis-(naphthalene-2,5-diol)propane, and 2,2'-butylene bis-(naphthalene-2,7-diol), (3-methyl-5-tert-butyl-4-hydroxyphenyl)-4'-hydroxy-phenyl)propane, 2,2'-methylene-bis-(4-methyl-5-isopropylphenol), 2,2'-methylene-bis-(4-methyl-5-isopropylphenol), 2,2'-methylene-bis-(5-tert-butyl-4-chlorophenol), (3,5-di-tert-butyl-4-hydroxyphenyl)-(4'-hydroxyphenyl)ethane, (2-hydroxy-phenyl)(3',5'-di-tert-butyl-4',4-hydroxyphenyl)ethane, 2,2'-methylene-bis-(4-octylphenol), 4,4'-propylene-bis-(2-tert-butyl-phenol), 2,2'-isobutylene-bis-(4-nonylphenol), 2,4-bis-(4-hydroxy-3-t-butyl-phenoxy)-6-(n-octylthio)-1,3,5-triazine, 2,4,6-tris-(4-hydroxy-3-t-butyl-phenoxy)-1,3,5-triazine, 2,2'-bis-(3-t-butyl-4-hydroxyphenyl)thiazolo-(5,4-d)thiazole, 2,2'-bis-(3-methyl-5-t-butyl-4-hydroxyphenyl)thiazolo-(5,4-d)thiazole, 4,4'-bis-(4-hydroxyphenyl)pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thiodiethanol-bis-(3-tert-butyl-4-hydroxyphenoxy acetate), 1,4-butanedio-bis-(3-tert-butyl-4-hydroxyphenoxy acetate), pentaerythritol tetra-(4-hydroxyphenol propionate), 2,4,4'-tri-hydroxy benzophenone, bis-(2-tert-butyl-3-hydroxy-5-methylphenyl)sulfide, bis-(2-tert-butyl-4-hydroxy-5-methylphenyl)sulfide, bis-(2-tert-butyl-4-hydroxy-5-methylphenyl)sulfoxide, bis-(3-ethyl-5-tert-butyl-4-hydroxybenzyl)sulfide, bis-(2-hydroxy-4-methyl-6-tert-butyl-phenyl)sulfide, 4,4'-bis-(4-hydroxyphenol)pentanoic acid octadecyl thiopropionate ester, 1,1,3-tris-(2'-methyl-4-hydroxy-5'-tert-butylphenyl)butane, 1,1,3-tris-(1-methyl-3-hydroxy-4-tert-butylphenyl)butane, 1,8-bis-(2-hydroxy-5-methyl-benzoyl-n-octane, 2,2'-ethylene-bis-[4'-(3-tert-butyl-4-hydroxyphenyl)-thiazole], 1-methyl-3-(3-methyl-5-tert-butyl-4-hydroxybenzyl)-naphthalene, 2,2'-(2-butene)-bis-(4-methoxy-6-tert-butylphenol)-bis-[3,3-bis-(4-hydroxy-3-t-butylphenyl)butyric acid]glycol ester, 4,4'-butylidene-bis-(6-t-butyl-m-cresol), 1,1,3-tris-(2-methyl-4-hydroxy-5-t-butylphenyl)butane, 1,3,5-tris-(3,5-di-t-butyl-4-hydroxybenzyl)-2,4,6-trimethylbenzene, tetrakis[methylene-3(3,5-di-t-butyl-4-hydroxyphenyl)propionate]methane, 1,3,5-tris-(3,5-di-t-butyl-4-hydroxybenzyl)isocyanurate, 1,3,5-tris-(3,5-di-t-butyl-4-hydroxyphenyl)propionyl-oxyethyl isocyanurate, 2- octylthio-4,6-di-(4-hydroxy-3,5-di-t-butyl)phenoxy-1,3,5-triazine, 4,4'-thiobis-(6-t-butyl-m-cresol) and pentaerythritol hydroxyphenyl propionate.

Additional examples of phenolic antioxidants include 2,6-diphenyl-4-octadecyloxyphenol, stearyl(3,5-di-t-butyl-4-hydroxyphenyl)propionate, distearyl-3,5-di-t-butyl-4-hydroxybenzylphosphonate, thiodiethylenebis(3,5-di-t-butyl-4-hydroxyphenylpropionate, hexamethylene-bis(3,5-di-t-butyl-4-hydroxyphenylpropionate, 2-octylthio-4,6-bis(3,5-di-t-butyl-4-hydroxyphenoxy)-s-triazine, 2,2'-methylenebis(4-methyl-6-t-butylphenol), 2,2'-methylenebis(4-ethyl-6-t-butylphenol), bis(3,3-bis(4-hydroxy-3-t-butylphenyl)butyric acid)glycol ester, 2,2'-ethylidenebis(4,6-di-t-butylphenol), 2,2'-ethylidenebis(4-sec-butyl-6-t-butylphenol), 3,6-dioxaoctylenebis(3-methyl-5-t-butyl-4-hydroxyphenylpropionate), bis(2-t-butyl-4-methyl-6-(2-hydroxy-3-t-butyl-5-methylbenzyl)phenyl)terephthalate, 1,3,5-tris(2,6-dimethyl-3-hydroxy-4-t-butylbenzyl)isocyanurate, 1,3,5-tris(3,5-di-t-butyl-4-hydroxybenzyl)-2,4,6-trimethylbenzene, 1,3,5-tris((3,5-di-t-butyl-4-hydroxyphenyl)propionyloxyethyl)isocyanurate, tetrakis(methylene-3-(3,5-di-t-butyl-4-hydroxyphenyl)propionate)methane.

A particularly desirable class of polyhydric polycyclic phenols are the dicyclopentadiene polyphenols, which are of the type:

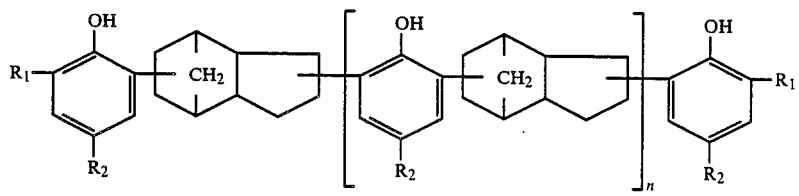

in which
R₁ and R₂ are lower alkyl, and can be the same or different, and
n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

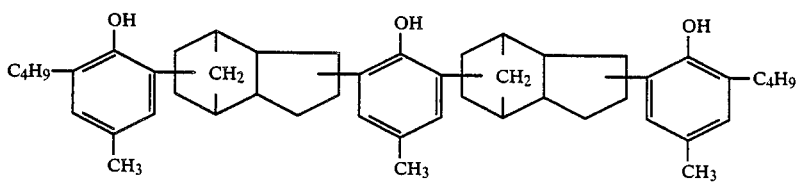

The polyhydric polycyclic phenols used in the invention can also be condensation products of phenols or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. Nos. 3,124,555, 3,242,135, and British Pat. No. 961,504.

In addition, the stabilizer compositions of the invention can include other stabilizers conventionally used as heat and/or light stabilizers for synthetic resins, including organic triphosphites and acid phosphites.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophosphites.

The organic triphosphites in which the radicals are monovalent radicals can be defined by the formula:

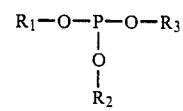

in which
R₁, R₂ and R₃ are selected from the group consisting of alkyl, alkenyl, aryl, alkaryl, aralkyl, and cycloalkyl groups having from one to about thirty carbon atoms.

The acid phosphites are defined by the same formula, but one or two of R₁, R₂ and R₃ is hydrogen or a cation of a metal or ammonium.

Also included are the organic triphosphites having a bivalent organic radical forming a heterocyclic ring with the phosphorus of the type:

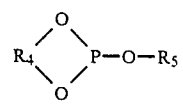

in which
R₄ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$;

$R_5$ is hydrogen or a cation, in the case of the acid phosphites.

Also useful organic triphosphites are mixed heterocyclic-open chain phosphites of the type:

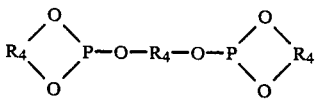

More complex triphosphites are formed from trivalent organic radicals, of the type:

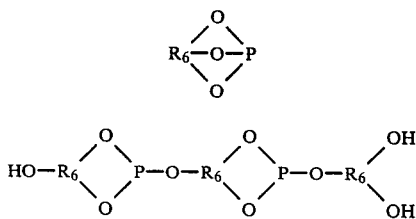

in which $R_6$ is a trivalent organic radical of any of the types of $R_1$ to $R_5$, inclusive, as defined above.

A particularly useful class of complex triphosphites are the tetraoxadiphosphaspiro undecanes of the formula:

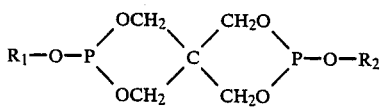

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl having from about 1 to about 30 carbon atoms.

In the case of the acid phosphites, one or both of $R_1$ and $R_2$ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula;

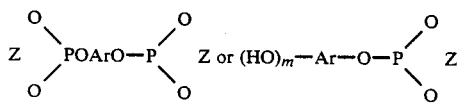

in which

Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms.

One or both Z radicals is also hydrogen, in the case of the acid phosphites, and can include additional bicyclic aromatic groups of the type $(HO)_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl)phosphite, tri-(t-nonylphenyl)phosphite, benzyl methyl isopropyl phosphite, butyl dicresyl phosphite, isooctyl di(octylphenyl)phosphite, di(2-ethylhexyl)(isooctylphenyl)phosphite, tri(2-cyclohexylphenyl)phosphite, tri-α-naphthyl phosphite, tri(phenylphenyl)phosphite, tri(2-phenylethyl)phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)-undecane (diphenyl-pentaerythritol diphosphite), 3,9-di(decyloxy)-2,4,8,10-tetraoxa-3,9-diphosphaspiro(5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane; 3,9-di(methoxyethyloxy)-2,4,8,10-tetraoxa-3,9-diphosphaspiro-(5,5)-undecane, 3-methoxyethyloxy-9-isodecyloxy-2,4,8,10-tetraoxa-3,9-diphosphaspiro-(5,5)-undecane, 3,9-di(ethoxyethyloxy)-2,4,8,10-tetraoxa-3,9-diphosphaspiro-(5,5)-undecane, 3,9-di(butoxyethyloxy)-2,4,8,10-tetraoxa-3,9-diphosphaspiro-(5,5)-undecane, 3-methoxyethyloxy-9-butoxy-ethyloxy-2,4,8,10-tetraoxa-3,9-diphosphaspiro-(5,5)-undecane, 3,9-di(methoxyethoxyethyloxy)-2,4,8,10-tetraoxa-3,9-diphosphaspiro-(5,5)-undecane, 3,9-di(butoxyethoxyethyloxy)-2,4,8,10-tetraoxa-3,9-diphosphaspiro-(5,5)-undecane, 3,9-di(methoxyethoxyethyloxy)-2,4,8,10-tetraoxa-3,9-diphosphaspiro-(5,5)-undecane, 3,9-di(methoxy(polyethoxy)ethyloxy)-2,4,8,10-tetraoxa-3,9-diphosphaspiro-(5,5)-undecane, where the (polyethoxy)ethyloxy group has an average molecular weight of 350), 3,9-di(methoxy(polyethoxy)ethyloxy)-2,4,8,10-tetraoxa-3,9-diphosphaspiro-(5,5)-undecane (where the (polyethoxy)ethyloxy group has an average molecular weight of 550).

Exemplary of the bis aryl triphosphites are: bis(4,4'-thio-bis(2-tertiary-butyl-5-methyl-phenol))isooctyl phosphite, mono(4,4'-thio-bis(2-tertiary-butyl-5-methyl-phenol))di-phenyl phosphite, tri-(4,4'-n-butylidene-bis(2-tertiary-butyl-5-methylphenol))phosphite, (4,4'-benzylidene-bis(2-tertiary-butyl-5-methyl-phenol)-

)diphenyl phosphite, isooctyl 2,2'-bis(-para-hydroxyphenyl)propane phosphite, decyl 4,4'-n-butylidene-bis(2-tertiary-butyl-5-methylphenol)phosphite, tri-4,4'-thio-bis(2-tertiary-butyl-5-methylphenol)phosphite, 2-ethylhexyl-2,2'-methylene-bis(4-methyl-6,1'-methylcyclohexyl)phenol phosphite, tri(2,2'-bis-(para-hydroxyphenyl)propane)phosphite, tri(4,4'-thio-bis(2-tertiary-butyl-5-methyl-phenol)phosphite, isooctyl(2,6-bis(2'-hydroxy-3,5-dinonylbenzyl)-4-nonyl phenyl))phosphite, tetra-tridecyl-4,4'-n-butylidene-bis(2-tertiary-butyl-5-methylphenyl)diphosphite, tetra-isooctyl-4,4'-thio-bis(2-tertiary-butyl-5-methylphenyl)diphosphite, 2,2'-methylene-bis(4-methyl-6,1'-methyl cyclohexyl phenyl)polyphosphite, isooctyl-4,4'-isopropylidene-bisphenyl polyphosphite, 2-ethylhexyl-2,2'-methylene-bis(4-methyl-6,1'-methyl-cyclohexyl)phenyl triphosphite, tetra-tridecyl-4,4'-oxydiphenyl diphosphite, tetra-n-dodecyl-4,4'-n-butylidene bis(2-tertiarybutyl-5-methylphenyl)diphosphite, tetra-tridecyl-4,4'-isopropylidene bisphenyl diphosphite, hexa-tridecyl butane-1,1,3-tris(2'-methyl-5'-tertiary-butylphenyl-4')triphosphite.

Exemplary acid phosphites are di(phenyl)phosphite, monophenyl phosphite, mono(diphenyl)phosphite, dicresyl phosphite, di-(o-isooctylphenyl)phosphite, di(p-ethylhexylphenyl)phosphite, di(p-t-octylphenyl)phosphite, di(dimethylphenyl)phosphite, di-n-butyl phosphite, di-2-ethylhexyl phosphite, mono-2-ethylhexylphosphite, diisooctyl phosphite, monoisooctyl phosphite, monododecyl phosphite, 2-ethylhexyl phenyl phosphite, 2-ethylhexyl-(n-octylphenyl)phosphite, monocyclohexyl phosphite, dicyclohexyl phosphite, di(2-cyclohexyl phenyl)phosphite, di-α-naphthyl phosphite, diphenyl phenyl phosphite, di(diphenyl)phosphite, di-(2-phenyl ethyl)phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis(4,4'-thio-bis(2-tertiary-butyl-5-methylphenol))-phosphite, (4,4'-thio-bis(2-tertiary-butyl-5-methylphenol))phenyl phosphite, bis(4,4'-n-butylidene-bis(2-tertiary-butyl-5-methylphenol))phosphite, mono(4,4'-benzylidene-bis(2-tertiary-butyl-5-methylphenol))-phosphite, mono(2,2'-bis-(parahydroxyphenyl)propane)phosphite, mono(4,4'-butylidene-bis(2-tertiary-butyl-5-methylphenol)phosphite, bis(4,4'-thio-bis(2-tertiary-butyl-5-methylphenol))phosphite, mono-2-ethylhexyl-mono-2,2'-methylene-bis(4-methyl-6,1'-methyl-cyclohexyl)phenol phosphite, bis(2,2'-bis(para-hydroxyphenyl)propane)phosphite, monoisooctyl-mono(4,4'-thio-bis(2-tertiary-butyl-5-methylphenol))phosphite, isooctyl-(2,6-bis(2'-hydroxy-3,5-dinonylbenzyl)-4-nonylphenyl))phosphite, tri-tridecyl-4,4'-n-butylidene-bis(2-tertiary-butyl-5-methylphenyl)diphosphite, trii-sooctyl-4,4'-thio-bis(2-tertiary-butyl-5-methylphenyl)-diphosphite, bis(2,2'-methylene-bis(4-methyl-6,1'-methyl cyclohexyl phenyl))phosphite, isooctyl-4,4'-isopropylidene-bis-phenyl phosphite, monophenyl mono(2,2'-methylene-bis(4-methyl-6,1'-methyl-cyclohexyl))triphosphite, di-tridecyl-4,4'-oxydiphenyl diphosphite, di-n-dodecyl-4,4'-n-butylidene-bis(2-tertiary-butyl-5-methylphenyl)diphosphite, di-tridecyl-4,4'-isopropylidene bisphenyl diphosphite, tetra-tridecylbutane-1,1,3-tris(2'-methyl-5-tertiary-butylphenyl-4)-triphosphite.

Conventional light stabilizers also can be employed, in addition, such as hydroxybenzophenones such as 2-hydroxy-4-methoxybenzophenone, 2-hydroxy-4-n-octoxy benzophenone, 2,4-dihydroxybenzophenone, benzotriazoles, such as 2(2-hydroxy-5-methylphenyl)-benzotriazoles, 2(2-hydroxy-3-t-butyl-5-methylphenyl)-5-chlorobenzotriazole, 2(2-hydroxy-3-5-di-t-butylphenyl)5-chlorobenzotriazole, 2(2-hydroxy-3,5-di-t-amylphenyl)benzotriazole, benzoates such as phenyl salicylate, 2,4-di-t-butylphenyl-3,5-di-t-butyl-4-hydroxy phenylbenzoate, nickel compounds such as nickel-2,2'-thiobis(4-t-octyl-phenolate), nickel-monoethyl(3,5-di-t-butyl-4-hydroxybenzyl)phosphonate, substituted acrylonitriles such as methyl-α-cyano-β-methyl-β-(p-methoxy phenyl)acrylate and oxalic anilides such as N-2-ethyl phenyl-N'-2-ethoxy-5-t-butyl phenyl oxalic diamide, N-2-ethyl phenyl-N'-2-ethoxy phenyl oxalic diamide, and 2,2,6,6-tetramethyl piperidine compounds.

A sufficient amount of the stabilizer composition is used to improve the resistance of the polycarbonatee resin to deterioration in physical properties when exposed to heat and light, including, for example, discoloration, reduction in melt viscosity and embrittlement. Very small amounts are usually adequate. Amounts within the range from about 0.001 to about 10% total stabilizers including the light stabilizer system of the invention by weight of the resin are satisfactory. Preferably, from 0.01 to 5% is employed for optimum stabilization.

Inasmuch as all components are solids, the stabilizer systems of the invention are readily rendered in solid particulate form, comprising a blend of:
  (a) a heat stabilizer for the polycarbonate resin in an amount of from about 10 to about 35 parts by weight;
  (b) alkylidene bis(benzotriazolyl phenol) or polymer thereof in an amount of from about 10 to about 35 parts by weight;
The heat stabilizer is at least one of:
  (c) a phenolic antioxidant in an amount from about 10 to about 35 parts by weight; and/or
  (d) other heat stabilizers in an amount of from about 10 to about 35 parts by weight.

An effective amount of phenolic antioxidant is within the range from about 0.001 to about 3 parts by weight, preferably from about 0.005 to about 1 part by weight, per 100 parts by weight of polycarbonate resin.

In addition, other conventional additives for polycarbonate resins, such as plasticizers, lubricants, emulsifiers, antistatic agents, flame-proofing agents, pigments and fillers, can be employed.

The stabilizer composition is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extruding or injection molding or fiber-forming. In such operations, it will be found to have a considerably improved resistance to reduction in melt viscosity during the heating, as well as a better resistance to discoloration and embrittlement on ageing and heating.

The following Examples represent preferred polycarbonate resin compositions of the invention.

EXAMPLES 1 TO 5

Polycarbonate resin compositions were prepared, using stabilizers of this invention, and having the following formulation:

| Ingredient | Parts by Weight |
| --- | --- |
| Bisphenol A polycarbonate resin (Intrinsic viscosity 0.57 in dioxane at 30° C.) | 100 |
| Stabilizer as shown in Table I | 0.3 |

The compositions were thoroughly blended in a mixer and then extruded at 260° C. to form pellets. The pellets were then injection-molded at 320° C. to form test pieces 2.5 mm thick.

The test pieces exposed to ultraviolet light using a high pressure mercury lamp for two weeks. The hours to failure were noted, and are shown in Table I.

The yellowness of the test pieces before and after irradiation was measured according to ASTM D 1925. The change in yellowness $\Delta YI$, after irradiation is shown in Table I.

TABLE 1

| Example No. | Stabilizer | $\Delta YI$ |
| --- | --- | --- |
| Control 1 | 2-(2'-Hydroxy-5-methylphenyl) benzotriazole | 16.6 |
| Control 2 | 2-(2'-Hydroxy-5'-t-octylphenyl) benzotriazole | 18.8 |
| Control 3 | 2-(2'-Hydroxy-3',5'-dicumylphenyl) benzotriazole | 15.5 |
| Example 1 | 2,2'-Methylenebis(4-methyl-6-benzotriazolyl phenol) | 10.7 |
| Example 2 | 2,2'-Methylenebis(4-(1,1,3,3-tetramethylbutyl)-6-benzotriazolyl phenol) | 10.0 |
| Example 3 | 2,2'-Methylenebis(4-cumyl-6-benzotriazolyl phenol) | 10.2 |
| Example 4 | 2,2'-Octylidenebis(4-methyl-(5'-methylbenzotriazolyl) phenol) | 11.3 |
| Example 5 | 2,2'-Octylidenebis(4-methyl-(5'-chlorobenzotriazolyl) phenol) | 11.1 |

The improvement when using an alkylidene bis(benzotriazolyl phenol) of the invention is apparent from comparison with the mono(benzotriazolyl phenols) of the controls.

EXAMPLES 6 TO 10

Polycarbonate resin compositions were prepared using stabilizers of this invention and having the following formulation:

| Ingredient | Parts by Weight |
| --- | --- |
| Bisphenol A polycarbonate resin (Intrinsic viscosity 0.57 in dioxane at 30° C.) | 100 |
| Stearyl($\beta$-(3,5-di-t-butyl-4-hydroxyphenyl) propionate) | 0.1 |
| Stabilizer as shown in Table II | 0.3 |

The compositions were thoroughly blended in a mixer and then extruded at 260° C. to form pellets. The pellets were then injection-molded at 320° C. to form test pieces 2.5 mm thick.

The test pieces exposed to ultraviolet light using a high pressure mercury lamp for two weeks. The hours to failure were noted, and are shown in Table II.

The yellowness of the test pieces before and after irradiation was measured according to ASTM D 1925. The change in yellowness $\Delta YI$, after irradiation is shown in Table II.

TABLE II

| Example No. | Stabilizer | $\Delta YI$ |
| --- | --- | --- |
| Control 1 | 2-(2'-Hydroxy-5-methylphenyl) benzotriazole | 11.6 |
| Control 2 | 2-(2'-Hydroxy-5'-t-octylphenyl) benzotriazole | 12.7 |
| Control 3 | 2-(2'-Hydroxy-3',5'-dicumylphenyl) benzotriazole | 11.5 |
| Example 6 | 2,2'-Methylenebis(4-methyl-6-benzotriazolyl phenol) | 7.8 |
| Example 7 | 2,2'-Methylenebis(4-(1,1,3,3-tetramethylbutyl)-6-benzotriazolyl phenol) | 7.4 |
| Example 8 | 2,2'-Methylenebis(4-cumyl-6-benzotriazolyl phenol) | 7.7 |
| Example 9 | 2,2'-Octylidenebis(4-methyl-(5'-methylbenzotriazolyl)phenol) | 8.4 |
| Example 10 | 2,2'-Octylidenebis(4-methyl-(5'-chlorobenzotriazolyl)phenol) | 8.5 |

The improvement when using an alkylidene bis(benzotriazolyl phenol) of the invention is apparent from comparison with the mono(benzotriazolyl phenols) of the controls.

Having regard to the foregoing disclosure the following is claimed as the inventive and patentable embodiments thereof:

1. A polycarbonate resin composition having improved resistance to deterioration when exposed to light, comprising a polycarbonate resin and an alkylidene bis(benzotriazolyl phenol) having the formula:

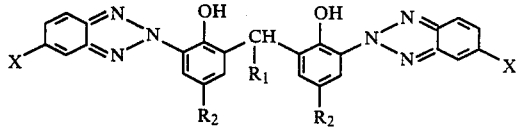

wherein:
   $R_1$ is selected from the group consisting of hydrogen and alkyl having from one to about eleven carbon atoms;
   $R_2$ is selected from the group consisting of alkyl having from one to about twelve carbon atoms; and arylalkyl having from seven to about eighteen carbon atoms; and
   X is selected from the group consisting of hydrogen; halogen; alkyl having from one to about twelve carbon atoms; aryl alkyl having from seven to about eighteen carbon atoms; alkoxy having from one to about twelve carbon atoms; phenoxy; arylalkoxy having from seven to about eighteen carbon atoms; and phenyl.

2. A polycarbonate resin composition according to claim 1 in which the polycarbonate resin is Bisphenol A polycarbonate.

3. A polycarbonate resin composition according to claim 1 in which $R_1$ is hydrogen.

4. A polycarbonate resin composition according to claim 1 in which $R_1$ is alkyl.

5. A polycarbonate resin composition according to claim 1 in which $R_2$ is alkyl.

6. A polycarbonate resin composition according to claim 1 in which $R_2$ is arylalkyl.

7. A polycarbonate resin composition according to claim 1 in which X is hydrogen.

8. A polycarbonate resin composition according to claim 1 in which X is halogen.

9. A polycarbonate resin composition according to claim 1 in which X is alkyl.

10. A polycarbonate resin composition according to claim 1 in which X is arylalkyl.

11. A polycarbonate resin composition according to claim 1 in which X is phenoxy.

12. A polycarbonate resin composition according to claim 1 in which X is alkoxy.

13. A polycarbonate resin composition according to claim 1 in which X is arylalkoxy.

14. A polycarbonate resin composition according to claim 1 in which X is phenoxy.

15. A polycarbonate resin composition according to claim 1 in which the alkylidene bis(benzotriazolyl phenol) is 2,2'-methylenebis(4-methyl-6-benzotriazolyl phenol).

16. A polycarbonate resin composition according to claim 1 in which the alkylidene bis(benzotriazolyl phenol) is 2,2'-methylenebis(4-(1,1,3,3-tetramethylbutyl)-6-benzotriazolyl phenol).

17. A polycarbonate resin composition according to claim 1 in which the alkylidene bis(benzotriazolyl phenol) is 2,2'-methylenebis(4-cumyl-6-benzotriazolyl phenol).

18. A polycarbonate resin composition according to claim 1 in which the alkylidene bis(benzotriazolyl phenol) is 2,2'-octylidenebis(4-methyl-(5'-methylbenzotriazolyl)phenol).

19. A polycarbonate resin composition according to claim 1 in which the alkylidene bis(benzotriazolyl phenol) is 2,2'-octylidenebis(4-methyl-(5'-chlorobenzotriazolyl)phenol).

20. A polycarbonate resin composition according to claim 1 in which $R_1$ is hydrogen, $R_2$ is alkyl and X is hydrogen.

21. A polycarbonate resin composition according to claim 1 in which $R_1$ is alkyl, $R_2$ is alkyl and X is alkyl.

22. A polycarbonate resin composition according to claim 1 in which $R_1$ is alkyl, $R_2$ is alkyl and X is halogen.

23. A polycarbonate resin composition according to claim 1 in which $R_1$ is hydrogen, $R_2$ is arylalkyl and X is hydrogen.

24. A polycarbonate resin composition according to claim 1 which in addition comprises a heat stabilizer for polycarbonate resin.

25. A polycarbonate resin composition according to claim 24 in which the heat stabilizer is a phenolic antioxidant.

26. A polycarbonate resin composition according to claim 24 in which the heat stabilizer is an organic phosphite.

* * * * *

# REEXAMINATION CERTIFICATE (2533rd)

United States Patent [19]

Nakahara et al.

[11] B1 4,812,498

[45] Certificate Issued  Apr. 11, 1995

[54] POLYCARBONATE RESIN COMPOSITIONS HAVING IMPROVED RESISTANCE TO DETERIORATION WHEN EXPOSED TO LIGHT AND CONTAINING ALKYLIDENE BIS(BENZOTRIAZOLYL PHENOLS)

[75] Inventors: Yutaka Nakahara, Okegawa; Atsushi Nishimura, Washinomiya; Toshio Nakajima, Urawa, all of Japan

[73] Assignee: Adeka Argus Chemical Co., Ltd., Urawa, Japan

Reexamination Request:
No. 90/002,720, May 1, 1992

Reexamination Certificate for:
Patent No.: 4,812,498
Issued: Mar. 14, 1989
Appl. No.: 945,733
Filed: Dec. 22, 1986

[51] Int. Cl.⁶ .......................................... C08K 5/3475
[52] U.S. Cl. .......................................... 524/91; 524/83; 524/84; 524/99; 524/100; 524/102; 524/111; 524/118; 524/119; 524/120; 524/141; 524/148; 524/151; 524/153; 524/157; 524/336; 524/337; 524/338
[58] Field of Search .................. 524/91, 120, 141, 148, 524/151, 153, 157

[56] References Cited

U.S. PATENT DOCUMENTS 3,936,305  2/1976  Hiraishi ................................. 96/84

FOREIGN PATENT DOCUMENTS 141206  5/1971  Czechoslovakia .
1670951  2/1971  Germany .

OTHER PUBLICATIONS

Chemical Abstract 62720h.

*Primary Examiner*—Kriellion J. Morgan

[57] ABSTRACT

Polycarbonate resin compositions are provided having improved light stability and comprising an alkylidene bis(benzotriazolyl phenol) having the formula:

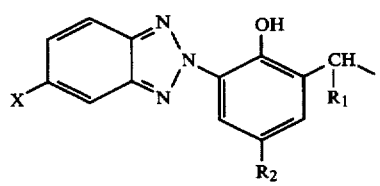

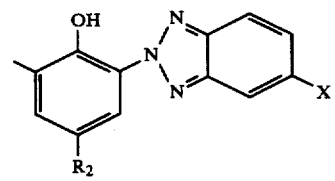

wherein:
R₁ is selected from the group consisting of hydrogen and alkyl having from one to about eleven carbon atoms;
R₂ is selected from the group consisting of alkyl having from one to about twelve carbon atoms; and arylalkyl having from seven to about eighteen carbon atoms; and
X is selected from the group consisting of hydrogen; halogen; alkyl having from one to about twelve carbon atoms; aryl alkyl having from seven to about eighteen carbon atoms; alkoxy having from one to about twelve carbon atoms; phenoxy; arylalkoxy having from seven to about eighteen carbon atoms; and phenyl.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2–23 are cancelled.

Claim 1 is determined to be patentable as amended.

Claims 24–26, dependent on an amended claim, are determined to be patentable.

1. A polycarbonate resin composition having improved resistance to deterioration when exposed to light, comprising a polycarbonate resin and [an alkylidene bis(benzotriazolyl phenol) having the formula:

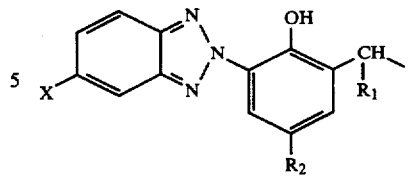

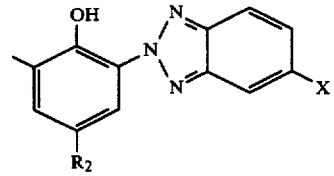

wherein:
R₁ is selected from the group consisting of hydrogen and alkyl having from one to about eleven carbon atoms;
R₂ is selected from the group consisting of alkyl having from one to about twelve carbon atoms; and arylalkyl having from seven to about eighteen carbon atoms; and
X is selected from the group consisting of hydrogen; halogen; alkyl having from one to about twelve carbon atoms; aryl alkyl having from seven to about eighteen carbon atoms; alkoxy having from one to about twelve carbon atoms; phenoxy; arylalkoxy having from seven to about eighteen carbon atoms; and phenyl] *2,2'-methylenebis(4-(1,1,3,3-tetramethylbutyl)-6-benzotriazolyl phenol)*.

* * * * *